US012737354B2

(12) United States Patent
Gojo et al.

(10) Patent No.: US 12,737,354 B2
(45) Date of Patent: Sep. 15, 2026

(54) LARGE LANGUAGE MODEL-BASED COMMUNICATION CONTENT GENERATION

(71) Applicant: Snowflake Inc., Bozeman, MT (US)

(72) Inventors: David Gojo, San Mateo, CA (US); Orestis Kostakis, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 41 days.

(21) Appl. No.: 18/609,667

(22) Filed: Mar. 19, 2024

(65) Prior Publication Data

US 2025/0298793 A1 Sep. 25, 2025

(51) Int. Cl.

| | |
|---|---|
| ***G06F 16/2452*** | (2019.01) |
| ***G06F 16/22*** | (2019.01) |
| ***G06F 40/20*** | (2020.01) |

(52) U.S. Cl.

CPC .... *G06F 16/24522* (2019.01); *G06F 16/2237* (2019.01); *G06F 40/20* (2020.01)

(58) Field of Classification Search

CPC ........... G06F 16/24522; G06F 16/2237; G06F 40/20; G06F 40/186; G06F 40/56; G06F 16/243; G06F 16/2379; G06F 16/24526; G06F 16/2453; G06F 16/24532; G06F 16/24534; G06F 16/24539; G06F 16/248; G06F 16/254; G06F 40/30

See application file for complete search history.

(56) References Cited

U.S. PATENT DOCUMENTS

| | | | | |
|---|---|---|---|---|
| 12,248,467 | B1 * | 3/2025 | Pendar | G06F 16/243 |
| 2018/0032576 | A1 * | 2/2018 | Romero | G06F 21/31 |
| 2019/0349477 | A1 * | 11/2019 | Kotak | H04M 3/4878 |
| 2020/0159502 | A1 * | 5/2020 | Bodin | G06F 8/30 |
| 2021/0124843 | A1 * | 4/2021 | Vass | G06Q 30/0255 |
| 2022/0343250 | A1 * | 10/2022 | Tremblay | G06F 3/0482 |
| 2023/0252233 | A1 * | 8/2023 | Gutierrez | G06F 40/40 704/9 |
| 2024/0411994 | A1 * | 12/2024 | Siracusano | G06F 40/205 |

* cited by examiner

*Primary Examiner* — Yogeshkumar Patel

(74) *Attorney, Agent, or Firm* — Schwegman Lundberg & Woessner, P.A.

(57) ABSTRACT

Various embodiments described herein provide for systems, methods, devices, instructions, and like for generating communication content using one or more large language models (LLMs). In particular, some embodiments provide a communication content generation system that generates content for a communication to a target organization using one or more LLMs and information regarding the target organization provided by an organization database, which can comprise curated organization-intelligence data.

20 Claims, 10 Drawing Sheets

700

USE CASE IDENTIFICATION

*WHAT USE CASES ARE YOU LOOKING FOR?*

WHAT ARE USE CASES IN LEGAL SERVICES INDUSTRY AND WHO ARE THE CUSTOMERS THAT ARE USING IT?
THE LEGAL SERVICES INDUSTRY CAN BENEFIT FROM SOURCE ORGANIZATION'S CLOUD-BASED DATA PLATFORM IN VARIOUS WAYS.
HERE ARE SOME USE CASES AND CUSTOMERS WHO HAVE SUCCESSFULLY IMPLEMENT OUR PRODUCT IN THEIR OPERATIONS:

1. E-DISCOVERY: LAW FIRMS AND LEGAL ORGANIZATIONS CAN USE OUR PRODUCT TO PROCESS, ANALYZE, AND REVIEW LARGE VOLUMES OF DATA FOR ELECTRONIC DISCOVERY. OUR PRODUCT'S ABILITY TO HANDLE RAW DATA IN JSON FORMAT AND RUN COMPLEX ANALYTICS AND DATA SCIENCE TASKS MAKES IT AN IDEAL SOLUTION FOR THIS USE CASE.
2. COMPLIANCE AND RISK MANAGEMENT: FINANCIAL INSTITUTIONS AND LEGAL ORGANIZATIONS CAN USE OUR PRODUCT TO MONITOR AND ANALYZE DATA IN REAL-TIME TO DETECT AND IDENTIFY PATTERNS THAT MAY INDICATE FRAUD OR NON-COMPLIANCE. OUR PRODUCT'S ABILITY TO HANDLE LARGE AMOUNTS OF DATA AND PROVIDE REAL-TIME REPORTING MAKES IT AN IDEAL SOLUTION FOR THIS USE CASE.
3. LEGAL RESEARCH: LEGAL RESEARCH FIRMS AND LAW LIBRARIES CAN USE OUR PRODUCT TO STORE, PROCESS, AND ANALYZE LARGE VOLUMES OF LEGAL DATA, SUCH AS CASE LAW, STATUTES, AND REGULATIONS. OUR PRODUCT'S ABILITY TO HANDLE STRUCTURED AND UNSTRUCTURED DATA AND RUN COMPLEX QUERIES MAKES IT AN IDEAL SOLUTION FOR THIS USE CASE.
4. CONTRACT MANAGEMENT: LEGAL DEPARTMENTS AND LAW FIRMS CAN USE OUR PRODUCT TO MANAGE AND ANALYZE CONTRACT DATA, INCLUDING CONTRACT TERMS, OBLIGATIONS, AND PERFORMANCE. OUR PRODUCT'S ABILITY TO HANDLE

STRUCTURED DATA AND RUN COMPLEX ANALYTICS AND DATA SCIENCE TASKS MAKE IT AN IDEAL SOLUTION FOR THIS USE CASE.
CUSTOMERS WHO HAVE SUCCESSFULLY IMPLEMENTED OUR PRODUCT IN THE LEGAL SERVICES INDUSTRY INCLUDE:

1. CREDIT SERVICE ABC: A LEADING PROVIDER OF CREDIT REPORTING AND RISK ASSESSMENT SERVICES, USES OUR PRODUCT TO INGEST AND ANALYZE LARGE VOLUMES OF DATA TO IMPROVE THEIR LENDING ABILITY.
2. FINANCIAL DATA PROVIDER DEF: A LEADING PROVIDER OF FINANCIAL DATA AND ANALYTICS, USES OUR PRODUCT TO HANDLE A LARGE INFLUX OF CUSTOMERS AND DATA, AND TO PROVIDE REAL-TIME REPORTING AND ANALYTICS.

THESE ARE JUST A FEW EXAMPLES OF HOW SOURCE ORGANIZATION'S CLOUD-BASED DATA PLATFORM CAN BE USED IN THE LEGAL SERVICES INDUSTRY. ITS ABILITY TO HANDLE LARGE VOLUMES OF DATA, PROVIDE REAL-TIME REPORTING, AND RUN COMPLEX ANALYTICS AND DATA SCIENCE TASKS MAKE IT AN IDEAL SOLUTION FOR A WIDE RANGE OF LEGAL USE CASES.

HELLO AMY BRODSKY:
I GOT TO LEARN ABOUT ABC LEGAL SERVICES AND HOW YOU'RE PROVIDING SOLUTIONS TO DIFFERENT INDUSTRIES. CURIOUS IF YOU'RE WORKING ON ANY NEW DATA PRODUCTS. BELIEVE OUR PRODUCT CAN HELP YOU ACHIEVE YOUR GOALS MORE EFFICIENTLY. WE SPECIALIZE IN PROVIDING A SCALABLE, SECURE, AND FULLY-MANAGED DATA PLATFORM THAT CAN HANDLE THE COMPLEXITIES OF GEOSPATIAL DATA.

OUR PLATFORM IS DESIGNED TO INGEST, PROCESS, AND ANALYZE MASSIVE AMOUNTS OF DATA FROM VARIOUS SOURCES, INCLUDING SATELLITE IMAGERY. BY LEVERAGING OUR PRODUCT'S CAPABILITIES, ABC LEGAL SERVICES CAN STREAMLINE ITS DATA WORKFLOWS, REDUCE COSTS, AND IMPROVE THE CUSTOMER EXPERIENCE.

HERE ARE SOME OF THE WAYS OUR PRODUCT CAN HELP ABC LEGAL SERVICES:
[LIST USE CASES, EXAMPLES ON HOW PROVIDED BELOW]
1. IMPROVED DATA INGESTION: OUR PRODUCT'S NATIVE JSON/GEOSPATIAL DATA INGESTION CAN SIMPLIFY ABC LEGAL SERVICE'S DATA PIPELINES AND REDUCE THE TIME IT TAKES TO INGEST AND PROCESS DATA.
2. ENHANCED DATA ANALYTICS: OUR PRODUCT'S ADVANCED ANALYTICS CAPABILITIES CAN HELP ABC LEGAL SERVICES GAIN INSIGHTS INTO ITS DATA MORE QUICKLY AND EASILY, ENABLING THE COMPANY TO MAKE MORE INFORMED DECISIONS.
3. FASTER TIME TO INSIGHT: WITH OUR PRODUCT'S SCALABLE AND FULLY-MANAGED PLATFORM, ABC LEGAL SERVICES CAN REDUCE THE TIME IT TAKES TO GET INSIGHTS FROM DAYS OR WEEKS TO MINUTES, ENABLING THE COMPANY TO RESPOND FASTER TO CHANGING MARKET CONDITIONS.

IS THERE A DAY THIS WEEK OR NEXT THAT WOULD WORK BEST FOR A CALL? PLEASE LET ME KNOW IF YOU HAVE ANY QUESTIONS OR WOULD LIKE TO SCHEDULE A CALL.

BEST,
JOHN SMITH

LLM PROMPT REVIEW:

<RULES> 1. YOUR NAME IS ALEK SIOK AND YOU ARE A SALES AGENT AT SOURCE ORGANIZATION AND HAVE A TITLE OF ACCOUNT EXECUTIVE. 2 YOUR GOAL IS TO WRITE A PROFESSIONAL EMAIL TO THE PERSON: AMY BRODSKY FROM COMPANY: ABC LEGAL SERVICES. 2. BE CONCISE IN YOUR WRITING, THE EMAIL SHOULD NOT BE LONGER THAN 150 WORDS. 3. SELECT TOP 3 USE CASES TO PROVIDE SHOWCASE BENEFITS TO THE CUSTOMER. 4. STRUCTURE THE EMAIL WITH THE FORMAT PROVIDED. 5. YOUR GOAL IS TO GIVE CORRECT ANSWER TO USERS, DOUBLE CHECK THAT USE CASES ARE RELEVANT TO THE EXAMPLE EMAIL. 6. POLITELY REQUEST A 30 MIN MEETING WITH THE CUSTOMER AT THE END OF THE EMAIL. 7. FORMAT THE OUTPUT BY BREAKING LINES AFTER BULLET POINTS SECTION AND AFTER PARAGRAPHS ENDS. 8. DOUBLE CHECK THAT THE EMAIL IS ADDRESSED TO COMPANY ABC LEGAL SERVICES AND LENGTH OF THE EMAIL DOESN'T EXCEED 150 WORDS! </RULES>. USE CASES: THE LEGAL SERVICES INDUSTRY CAN BENEFIT FROM SOURCE ORGANIZATION'S CLOUD-BASED DATA PLATFORM IN VARIOUS WAYS. HERE ARE SOME USE CASES AND CUSTOMERS WHO HAVE SUCCESSFULLY IMPLEMENTED OUR PRODUCT IN THEIR OPERATIONS:

1. E-DISCOVERY: LAW FIRMS AND LEGAL ORGANIZATIONS CAN USE OUR PRODUCT TO PROCESS, ANALYZE, AND REVIEW LARGE VOLUMES OF DATA FOR ELECTRONIC DISCOVERY. OUR PRODUCT'S ABILITY TO HANDLE RAW DATA IN JSON FORMAT AND RUN COMPLEX ANALYTICS AND DATA SCIENCE TASKS MAKES IT AN IDEAL SOLUTION FOR THIS USE CASE.
2. COMPLIANCE AND RISK MANAGEMENT: FINANCIAL INSTITUTIONS AND LEGAL ORGANIZATIONS CAN USE OUR PRODUCT TO MONITOR AND ANALYZE DATA IN REAL-TIME TO DETECT AND IDENTIFY PATTERNS THAT MAY INDICATE FRAUD OR NON-COMPLIANCE. OUR PRODUCT'S ABILITY TO HANDLE LARGE AMOUNTS OF DATA AND PROVIDE REAL-TIME REPORTING MAKES IT AN IDEAL SOLUTION FOR THIS USE CASE.
3. LEGAL RESEARCH: LEGAL RESEARCH FIRMS AND LAW LIBRARIES CAN USE OUR PRODUCT TO STORE, PROCESS, AND ANALYZE LARGE VOLUMES OF LEGAL DATA, SUCH AS CASE LAW, STATUTES, AND REGULATIONS. OUR PRODUCT'S ABILITY TO HANDLE STRUCTURED AND UNSTRUCTURED DATA AND RUN COMPLEX QUERIES MAKES IT AN IDEAL SOLUTION FOR THIS USE CASE.
4. CONTRACT MANAGEMENT: LEGAL DEPARTMENTS AND LAW FIRMS CAN USE OUR PRODUCT TO MANAGE AND ANALYZE CONTRACT DATA, INCLUDING CONTRACT TERMS, OBLIGATIONS, AND PERFORMANCE. OUR PRODUCT'S ABILITY TO HANDLE STRUCTURED DATA AND RUN COMPLEX ANALYTICS AND DATA SCIENCE TASKS MAKES IT AN IDEAL SOLUTION FOR THIS USE CASE.

CUSTOMERS WHO HAVE SUCCESSFULLY IMPLEMENTED OUR PRODUCT IN THE LEGAL SERVICES INDUSTRY INCLUDE:

1. CREDIT SERVICE ABC: A LEADING PROVIDER OF CREDIT REPORTING AND RISK ASSESSMENT SERVICES, USES OUR PRODUCT TO INGEST AND ANALYZE LARGE VOLUMES OF DATA TO IMPROVE THEIR LENDING ABILITY.
2. FINANCIAL DATA PROVIDER DEF: A LEADING PROVIDER OF FINANCIAL DATA AND ANALYTICS, USES OUR PRODUCT TO HANDLE A LARGE INFLUX OF CUSTOMERS AND DATA, AND TO PROVIDE REAL-TIME REPORTING AND ANALYTICS.

THESE ARE JUST A FEW EXAMPLES OF HOW 'S CLOUD-BASED DATA PLATFORM CAN BE USED IN THE LEGAL SERVICES INDUSTRY. ITS ABILITY TO HANDLE LARGE VOLUMES OF DATA, PROVIDE REAL-TIME REPORTING, AND RUN COMPLEX ANALYTICS AND DATA SCIENCE TASKS MAKES IT AN IDEAL SOLUTION FOR A WIDE RANGE OF LEGAL USE CASES. DRAFT AN EMAIL.

FIG. 9

LARGE LANGUAGE MODEL-BASED COMMUNICATION CONTENT GENERATION

TECHNICAL FIELD

Embodiments described herein relate to content generation and, more particularly, to systems, methods, devices, and instructions for generating communication content using one or more large language models (LLMs).

BACKGROUND

The process of initiating relationships often begins with the first point of contact, which is frequently achieved through direct outreach methods such as cold calls or cold emails. These initial communications can set the tone for potential future interactions and can significantly influence the likelihood of establishing a successful relationship.

In the context of cold emailing, the goal is to capture the recipient's attention and engage them in a conversation that may lead to an opportunity. The content is usually concise enough to respect the recipient's time while providing enough value to pique their interest. This often involves a personalized approach that demonstrates an understanding of the recipient's needs and how the sender's offerings could address those needs. Personalization of cold emails typically involves a considerable investment of time and resources. Employees responsible for new client outreach usually conduct thorough research on a target organization (e.g., company) to identify potential common ground, such as shared goals, recent organization achievements, or relevant industry events. This research can be important for tailoring the email content to the specific context and interests of the recipient, thereby increasing the chances of the email being well-received and not dismissed as spam.

The task of personalizing emails is not trivial and often involves employees sifting through various sources of information, including organization websites, news articles, industry reports, and potentially a customer relationship management (CRM) system that may contain historical data on past interactions. The challenge is compounded when individuals are tasked with sending multiple prospecting emails to different organizations (hereafter, target organizations) each day. This repetitive and time-consuming process can lead to inefficiencies and increased costs for an organization (hereafter, source organization) that is reaching out to different organizations. Additionally, the quality of the personalized content can be directly related to an individual's skill in synthesizing the gathered information into a coherent and engaging message. This skill varies among individuals, leading to inconsistencies in the effectiveness of the cold emails sent out.

BRIEF DESCRIPTION OF THE SEVERAL VIEWS OF THE DRAWINGS

The present disclosure will be understood more fully from the detailed description given below and from the accompanying drawings of various embodiments of the disclosure.

FIGS. 6 through 9 illustrate example graphical user interfaces that can be used with various embodiments of the present disclosure.

DETAILED DESCRIPTION

Figure 1:
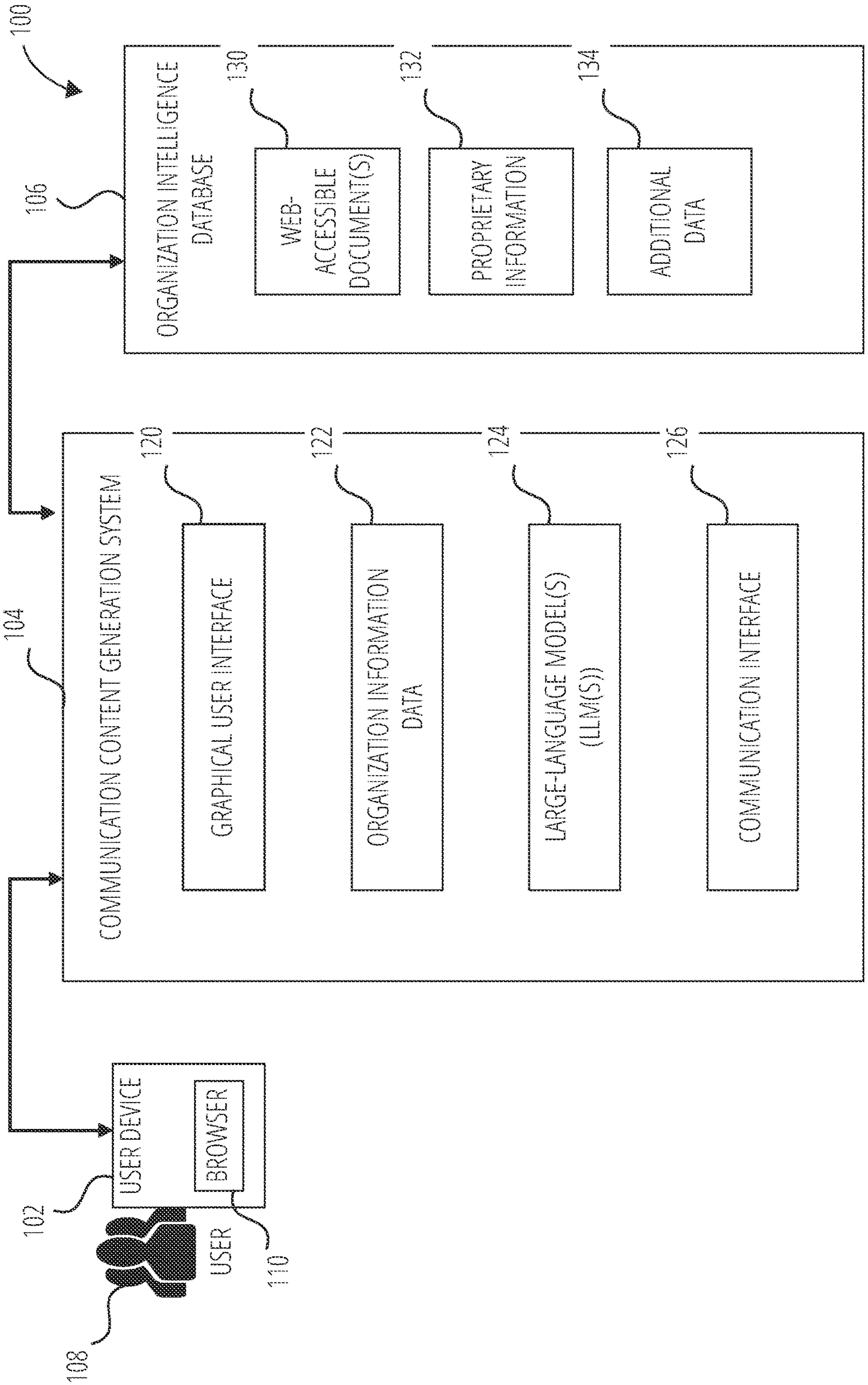
FIG. 1 illustrates an example of a computing environment that includes a communication content generation system that implements operations described herein, in accordance with some embodiments of the present disclosure.

Reference will now be made in detail to specific embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

At present, generating emails and other communication for client prospecting can be a labor-intensive process that involves significant time and effort from client professionals (e.g., in sales and marketing). For example, the need for personalization and the high volume of emails (e.g., cold e-mails) sent out daily can present challenges that impact the efficiency and scalability of client outreach efforts.

Various embodiments described herein provide for systems, methods, devices, instructions, and like for generating communication content using one or more large language models (LLMs). In particular, some embodiments provide a communication content generation system that generates content for a communication to a target organization, such as an e-mail or a transcript, using one or more LLMs and information regarding the target organization provided by an organization database, which can comprise curated organization-intelligence data. For example, the organization database can be curated and maintained to include business-intelligence data, such as information about one or more business practices of one or more companies. Company information can comprise information indicating a business area (also known as a business vertical), number of employees, or recent news (e.g., new product launches, mergers and acquisitions, big contracts and agreements, sponsorship, etc.). Organization information can include information regarding one or more interactions between a source organization (e.g., source company) using an embodiment and a target organization (e.g., target company), and information regarding what products or services the target organization's clients are using. Information in the organization database can include information provided by a CRM (customer relationship management) system.

According to some embodiments, a user (e.g., of a source organization) logs into the communication content generation system and is presented with a graphical user interface (UI). The user can select the name of a target organization (e.g., a target company) from a list of target organizations, where the list can be one assigned to the user. Upon selecting the target organization, the communication content generation system can perform one or more queries on an organization database (e.g., business intelligence database) that comprises information for the target organization. The one or more queries can comprise a query that checks for a business area that the target organization operates within and can pre-populate the graphical user interface with information. Additionally, the communication content generation system can fetch information related to the target organization for a series of categories, and for each category, the communication content generation system can either pre-populate each field or compile a list of data points. The user can then select one or more appropriate data points to retain or use from the list, and the user can override (e.g., through the graphical user interface) one or more data points pre-populated in fields of the graphical user interface. Once the user approves the list of selected data points or overridden data points, the communication content generation system can generate one or more appropriate prompts (e.g., a set of instructions) for one or more LLMs using the approved list of data points. For various embodiments, the one or more LLMs receive as input the one or more prompts and generate content for a communication (e.g., content for a draft e-mail to the target organization). The user can be presented in the graphical user interface with the content (e.g., e-mail content) and can either: approve the content; make inline one or more modifications to the content and then approve the content as modified; or restart the process if they are not satisfied with the content, or want to choose one or more alternative data points to use to generate the content.

Some embodiments provide a technical solution that uses a graphical user interface, an organization database, and one or more LLMs to generate communication content, which can obviate the need to manually research target organizations, identify relevant data points, and synthesize information into communication content. Use of some embodiments can, for example, reduce the time it takes to generate (e.g., craft) a prospecting communication (e.g., e-mail) to seconds, and obviate the need to manually research target organizations, identify relevant data points, and synthesize information to draft communication content, which can be labor-intensive and can result in ineffective communication with multiple inconsistencies.

As used herein, a communication can include an e-mail, a transcript (e.g., for a telephone conversation), a message on a social media platform, or the like. As used herein, a given large-language model (LLM) can include a GPT model (e.g., GPT-4), a LLAMA model (e.g., LLAMA-2), or another type of generative model (e.g., a proprietary or tailored model). As used herein, an organization can include a for-profit organization (e.g., business or company) or a non-profit organization (e.g., educational institution or charity).

FIG. 1 illustrates an example of a computing environment 100 that includes a communication content generation system 104 that implements operations described herein, in accordance with some embodiments of the present disclosure. One or more components of the communication content generation system 104 can be implemented using machine 1000 as described herein with respect to FIG. 10.

As utilized herein, circuits, controllers, computing devices, components, modules, or other similar aspects set forth herein should be understood broadly. Such terminology is utilized to highlight that the related hardware devices can be configured in a number of arrangements, and include any hardware configured to perform the operations herein. Any such devices can be a single device, a distributed device, and/or implemented as any hardware configuration to perform the described operations. In certain embodiments, hardware devices can include computing devices of any type, logic circuits, input/output devices, processors, sensors, actuators, web-based servers, LAN servers, WLAN servers, cloud computing devices, memory storage of any type, and/or aspects embodied as instructions stored on a computer-readable medium and configured to cause a processor to perform recited operations. Communication between devices, whether inter-communication (e.g., a user device 102 communicating with communication content generation system 104) or intra-device communication (e.g., one circuit or component of the communication content generation system 104 communicating with another circuit or component of the communication content generation system 104) can be performed in any manner, for example using internet-based communication, LAN/WLAN communication, direct networking communication, Wi-Fi communication, or the like.

According to various embodiments, the communication content generation system 104 is configured to generate communication content using organization information from an organization-intelligence database and one or more LLMs. As shown, the communication content generation system 104 comprises a graphical user interface 120, organization information data 122, one or more large-language models 124, and a communication interface 126. A user 108 at the user device 102 can access the communication content generation system 104 and use the communication content generation system 104 to generate content for a communication. For example, the user 108 can use a browser 110 on the user device 102 to access the communication content generation system 104 and as part of the access, the graphical user interface 120 of the communication content generation system 104 can cause presentation of one or more graphical user interfaces on the user device 102 (e.g., on the browser 110). The user 108 can represent a user at a source organization that intends to reach out (e.g., contact) to one or more target organizations as prospective clients of the source organization. The user 108 can login into the communication content generation system 104.

After the user 108 logs into the communication content generation system 104, the communication content generation system 104 can retrieve one or more target organizations assigned to the user 108 for prospecting, and present those one or more target organizations to the user 108 as a list of target organizations on the graphical user interface 120. The user 108 can select one or more target organizations from the list via the graphical user interface 120.

For at least one selected target organization, the communication content generation system 104 can retrieve, from the organization information data 122, information for the selected target organization. Additionally, the communication content generation system 104 can retrieve information regarding the selected target organization from the organization intelligence database 106 by performing one or more queries on the organization intelligence database 106 (e.g., across different tables or sub-repositories in the organization intelligence database 106). For various embodiments, the organization intelligence database 106 comprises curated information regarding one or more organizations, with the sources of that information including one or more web-accessible documents 130 (e.g., new websites, the selected organization's website), proprietary information 132 (e.g., data from a source organization's CRM system, such prior interactions with the selected target organization), and other additional data 134 (e.g., provided by third-party proprietary databases). For some embodiments, the information retrieved for the selected target organization comprises one or more data points related to (e.g., relevant to) the selected target organization. The communication content generation system 104 can present the retrieved information to the user 108 for review via the graphical user interface 120 (e.g., presented as a list of data points or as pre-populated fields), and can do so prior to moving to one or more next steps in generating communication content. For example, from the list of data points presented in the graphical user interface 120, the user 108 can use the graphical user interface 120 to select one or more (e.g., all) data points the user 108 desires to use in generating the communication content, to modify one or more (e.g., all) data points, or to approve the one or more selected data points (as modified or unmodified) for use in next steps of the communication content generation process.

Based on one or more data points selected (and possibly modified) by the user 108, the communication content generation system 104 can generate (e.g., craft) one or more prompts as input to one or more of the LLMs 124. According to some embodiments, the communication content generation system 104 uses at least one of the selected data points to determine (e.g., select or identify) a use case, a communication template, or both, which can be used in generating the one or more prompts. For instance, the communication content generation system 104 can: determine the one or more use cases, one or more communication templates, or both based on one or more selected data points; present the one or more use cases, the one or more communication templates, or both in the graphical user interface 120; and permit the user 108 to select (with or without modification) at least one use case, at least one communication template, or both for use in generating the one or more prompts. The determination of the use case (e.g., determination of one or more use cases) can comprise using a specific LLM model (e.g., an LLM model different from the LLMs 124 and other LLM models used by the communication content generation system 104) to select or generate the use case. Additionally, the determination of the communication template (e.g., determination of one or more communication templates) can comprise using a specific LLM model (e.g., an LLM model different from the LLMs 124 and other LLM models used by the communication content generation system 104) to select or generate the communication template. Eventually, the one or more prompts generated by the communication content generation system 104 can be processed by one or more of the LLMs 124 to generate content for the communication desired by the user 108.

After the content is generated by the communication content generation system 104, the generated content can be presented to the user 108 via the graphical user interface 120 for review. Subsequently, the user 108 can approve the generated content (with modification or without modification) via the graphical user interface 120 and, in response, the communication content generation system 104 can cause (e.g., the communication interface 126) a communication comprising the generated content to be sent to a recipient at the selected target organization. Prior to content approval by the user 108, the user 108 can modify the generated content via the graphical user interface 120 (e.g., perform one or more inline modifications to the generated content as presented in the graphical user interface 120). Alternatively, the user 108 can reject the generated content, which can permit the user 108 to return to a prior step of the communication content generation process. For instance, after rejecting the generated content, the communication content generation system 104 can return to the step where one or more data points (retrieved from the organization intelligence database 106) are presented to the user 108 for selection, modification, or both.

According to some embodiments, after a communication comprising (approved) generated content is sent (e.g., by the communication content generation system 104), the communication content generation system 104 updates the organization intelligence database 106 (e.g., updates proprietary information 132 therein) regarding the communication being sent to the selected target organization. For example, the communication content generation system 104 can update the organization intelligence database 106 to include a copy of the communication sent to a recipient of the selected target organization.

Figure 2:
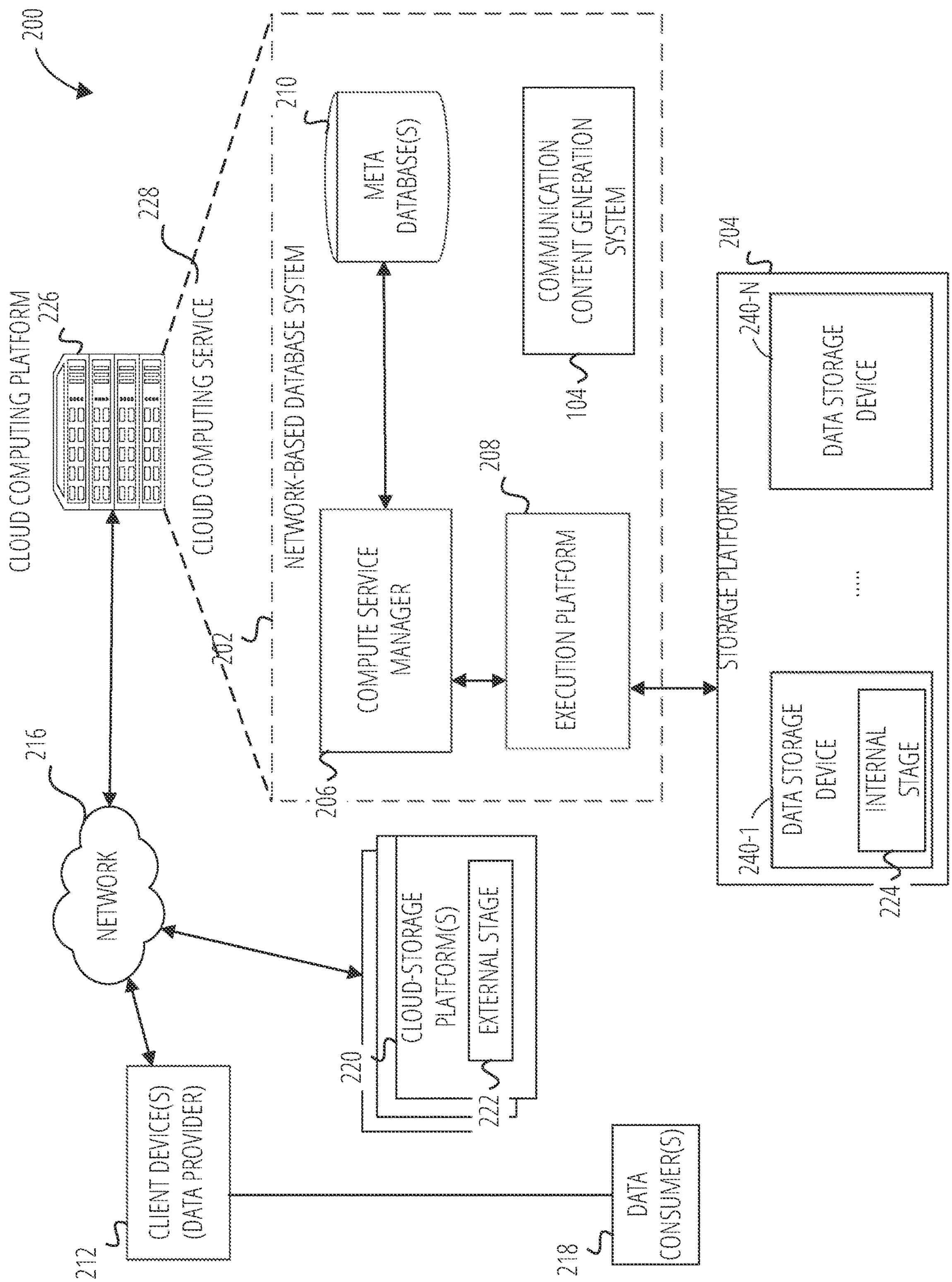
FIG. 2 illustrates an example computing environment that includes a cloud data platform in communication with a cloud storage provider system, according to some embodiments of the present disclosure.

FIG. 2 illustrates an example computing environment 200 that includes a database system in the example form of a network-based database system 202, according to some embodiments of the present disclosure. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the computing environment 200 to facilitate additional functionality that is not specifically described herein. In other embodiments, the computing environment may comprise another type of network-based database system or a cloud data platform. For example, in some embodiments, the computing environment 200 may include a cloud computing platform 226 with the network-based database system 202, and a storage platform 204 (also referred to as a cloud storage platform). The cloud computing platform 226 provides computing resources and storage resources that may be acquired (purchased) or leased and configured to execute applications and store data.

The cloud computing platform 226 may host a cloud computing service 228 that facilitates storage of data on the cloud computing platform 226 (e.g., data management and access) and analysis functions (e.g., SQL queries, analysis), as well as other processing capabilities (e.g., configuring replication group objects as described herein). The cloud computing platform 226 may include a three-tier architecture: data storage (e.g., storage platforms 204), an execution platform 208 (e.g., providing query processing), and a compute service manager 206 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™) MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 226 could also use a cloud-storage platform as what is referred to herein as an internal storage location concerning the data platform.

From the perspective of the network-based database system 202 of the cloud computing platform 226, one or more files that are stored at one or more storage locations are referred to herein as being organized into one or more of what is referred to herein as either "internal stages" or "external stages." Internal stages (e.g., internal stage 224) are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 202 of the cloud computing platform 226 is in communication with the storage platforms 204 and cloud-storage platforms 220 (e.g., AWS®, Microsoft Azure Blob Storage®, or Google Cloud Storage). The network-based database system 202 is a network-based system used for reporting and analysis of integrated data from one or more disparate sources including one or more storage locations within the storage platform 204. The storage platform 204 comprises a plurality of computing machines and provides on-demand computer system resources such as data storage and computing power to the network-based database system 202.

The network-based database system 202 comprises a compute service manager 206, an execution platform 208, and one or more meta databases 210. The network-based database system 202 hosts and provides data reporting and analysis services to multiple client accounts.

The compute service manager 206 coordinates and manages operations of the network-based database system 202. The compute service manager 206 also performs query optimization and compilation as well as managing clusters of computing services that provide compute resources (also referred to as "virtual warehouses"). The compute service manager 206 can support any number of client accounts such as end-users providing data storage and retrieval requests, system administrators managing the systems and methods described herein, and other components/devices that interact with compute service manager 206.

The compute service manager 206 is also in communication with a client device 212. The client device 212 corresponds to a user of one of the multiple client accounts supported by the network-based database system 202. A user may utilize the client device 212 to submit data storage, retrieval, and analysis requests to the compute service manager 206. Client device 212 (also referred to as remote computing device or user client device 212) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 226 (e.g., cloud computing service 228) by way of a network 216, such as the Internet or a private network. A data consumer 218 can use another computing device to access the data of the data provider (e.g., data obtained via the client device 212).

In the description below, actions are ascribed to users, particularly consumers and providers. Such actions shall be understood to be performed concerning client device (or devices) 212 operated by such users. For example, a notification to a user may be understood to be a notification transmitted to the client device 212, input or instruction from a user may be understood to be received by way of the client device 212, and interaction with an interface by a user shall be understood to be interaction with the interface on the client device 212. In addition, database operations (joining, aggregating, analysis, etc.) ascribed to a user (consumer or provider) shall be understood to include performing such actions by the cloud computing service 228 in response to an instruction from that user.

The compute service manager 206 is also coupled to one or more meta databases 210 that store metadata about various functions and aspects associated with the network-based database system 202 and its users. For example, a metadata database 210 may include a summary of data stored in remote data storage systems as well as data available from a local cache. Additionally, a metadata database 210 may include information regarding how data is organized in remote data storage systems (e.g., the cloud storage platform 204) and the local caches. Information stored by a metadata database 210 allows systems and services to determine whether a piece of data needs to be accessed without loading or accessing the actual data from a storage device. In some embodiments, metadata database 210 is configured to store account object metadata (e.g., account objects used in connection with a replication group object).

Figure 3:
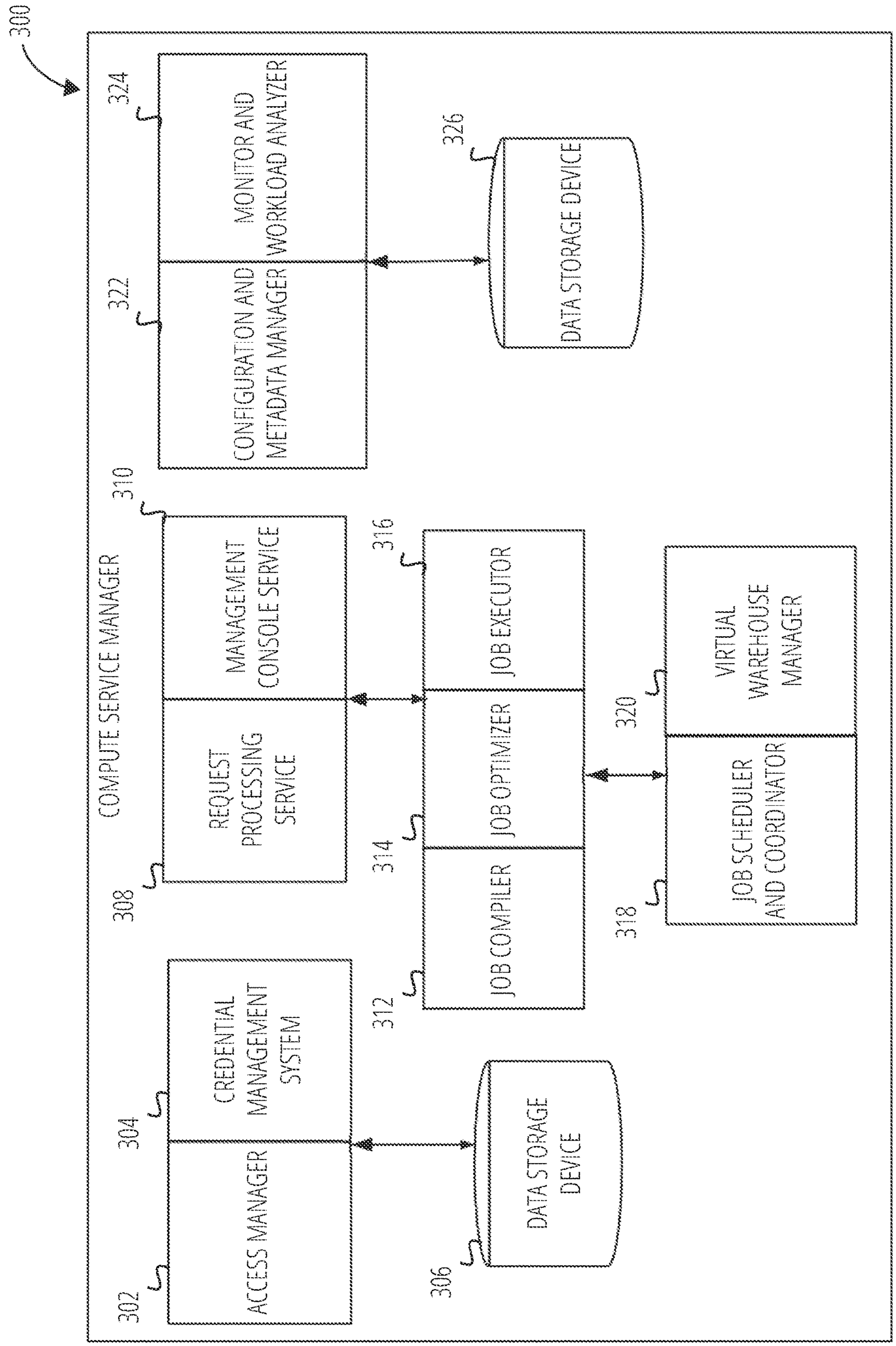
FIG. 3 is a block diagram illustrating components of a compute service manager, according to some embodiments of the present disclosure.

The compute service manager 206 is further coupled to the execution platform 208, which provides multiple computing resources that execute various data storage and data retrieval tasks. As illustrated in FIG. 3, the execution platform 208 comprises a plurality of compute nodes. The execution platform 208 is coupled to storage platform 204 and cloud-storage platforms 220. The storage platform 204 comprises multiple data storage devices 240-1 to 240-N. In some embodiments, the data storage devices 240-1 to 240-N are cloud-based storage devices located in one or more geographic locations. For example, the data storage devices 240-1 to 240-N may be part of a public cloud infrastructure or a private cloud infrastructure. The data storage devices 240-1 to 240-N may be hard disk drives (HDDs), solid-state drives (SSDs), storage clusters, Amazon S3™ storage systems, or any other data-storage technology. Additionally, the cloud storage platform 204 may include distributed file systems (such as Hadoop Distributed File Systems (HDFS)), object storage systems, and the like. In some embodiments, at least one internal stage 224 may reside on one or more of the data storage devices 240-1-240-N, and at least one external stage 222 may reside on one or more of the cloud-storage platforms 220.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

The compute service manager 206, metadata database(s) 210, execution platform 208, and storage platform 204, are shown in FIG. 2 as individual discrete components. However, each of the compute service manager 206, metadata database(s) 210, execution platform 208, and storage platform 204 may be implemented as a distributed system (e.g., distributed across multiple systems/platforms at multiple geographic locations). Additionally, each of the compute service manager 206, metadata database(s) 210, execution platform 208, and storage platform 204 can be scaled up or down (independently of one another) depending on changes to the requests received and the changing needs of the network-based database system 202. Thus, in the described embodiments, the network-based database system 202 is dynamic and supports regular changes to meet the current data processing needs.

During a typical operation, the network-based database system 202 processes multiple jobs determined by the compute service manager 206. These jobs are scheduled and managed by the compute service manager 206 to determine when and how to execute the job. For example, the compute service manager 206 may divide the job into multiple discrete tasks and may determine what data is needed to execute each of the multiple discrete tasks. The compute service manager 206 may assign each of the multiple discrete tasks to one or more nodes of the execution platform 208 to process the task. The compute service manager 206 may determine what data is needed to process a task and further determine which nodes within the execution platform 208 are best suited to process the task. Some nodes may have already cached the data needed to process the task and, therefore, be a good candidate for processing the task. Metadata stored in a metadata database 210 assists the compute service manager 206 in determining which nodes in the execution platform 208 have already cached at least a portion of the data needed to process the task. One or more nodes in the execution platform 208 process the task using data cached by the nodes and, if necessary, data retrieved from the storage platform 204. It is desirable to retrieve as much data as possible from caches within the execution platform 208 because the retrieval speed is typically much faster than retrieving data from the storage platform 204.

As shown in FIG. 2, the cloud computing platform 226 of the computing environment 200 separates the execution platform 208 from the storage platform 204. In this arrangement, the processing resources and cache resources in the execution platform 208 operate independently of the data storage devices 240-1 to 240-N in the storage platform 204. Thus, the computing resources and cache resources are not restricted to specific data storage devices 240-1 to 240-N. Instead, all computing resources and all cache resources may retrieve data from, and store data to, any of the data storage resources in the storage platform 204.

FIG. 3 is a block diagram 300 illustrating components of the compute service manager 206, according to some embodiments of the present disclosure. As shown in FIG. 3, the compute service manager 206 includes an access manager 302 and a credential management system 304 coupled to access data storage device 306, which is an example of the metadata database(s) 210.

Access manager 302 handles authentication and authorization tasks for the systems described herein. The credential management system 304 facilitates use of remote stored credentials to access external resources such as data resources in a remote storage device. As used herein, the remote storage devices may also be referred to as "persistent storage devices" or "shared storage devices." For example, the credential management system 304 may create and maintain remote credential store definitions and credential objects (e.g., in the data storage device 306). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 304 and access manager 302 use information stored in the data storage device 306 (e.g., a credential object and a credential store definition) to retrieve security credentials used to access the external resource from a remote credential store.

A request processing service 308 manages received data storage requests and data retrieval requests (e.g., jobs to be performed on database data). For example, the request processing service 308 may determine the data to process a received query (e.g., a data storage request or data retrieval request). The data can be stored in a cache within the execution platform 208 or in a data storage device in storage platform 204.

A management console service 310 supports access to various systems and processes by administrators and other system managers. Additionally, the management console service 310 may receive a request to execute a job and monitor the workload on the system.

The compute service manager 206 also includes a job compiler 312, a job optimizer 314, and a job executor 316. The job compiler 312 parses a job into multiple discrete tasks and generates the execution code for each of the multiple discrete tasks. The job optimizer 314 determines the best method to execute the multiple discrete tasks based on the data that needs to be processed. The job optimizer 314 also handles various data pruning operations and other data optimization techniques to improve the speed and efficiency of executing the job. The job executor 316 executes the execution code for jobs received from a queue or determined by the compute service manager 206.

A job scheduler and coordinator 318 sends received jobs to the appropriate services or systems for compilation, optimization, and dispatch to the execution platform 208. For example, jobs can be prioritized and then processed in that prioritized order. In an embodiment, the job scheduler and coordinator 318 determines a priority for internal jobs that are scheduled by the compute service manager 206 with other "outside" jobs such as user queries that can be scheduled by other systems in the database but may utilize the same processing resources in the execution platform 208. In some embodiments, the job scheduler and coordinator 318 identifies or assigns particular nodes in the execution platform 208 to process particular tasks. A virtual warehouse manager 320 manages the operation of multiple virtual warehouses implemented in the execution platform 208. For example, the virtual warehouse manager 320 may generate query plans for executing received queries.

Additionally, the compute service manager 206 includes a configuration and metadata manager 322, which manages the information related to the data stored in the remote data storage devices and in the local buffers (e.g., the buffers in execution platform 208). The configuration and metadata manager 322 uses metadata to determine which data files need to be accessed to retrieve data for processing a particular task or job. A monitor and workload analyzer 324 oversees processes performed by the compute service manager 206 and manages the distribution of tasks (e.g., workload) across the virtual warehouses and execution nodes in the execution platform 208. The monitor and workload analyzer 324 also redistributes tasks, as needed, based on changing workloads throughout the cloud computing platform 226 and may further redistribute tasks based on a user (e.g., "external") query workload that may also be processed by the execution platform 208. The configuration and metadata manager 322 and the monitor and workload analyzer 324 are coupled to a data storage device 326. Data storage device 326 in FIG. 3 represents any data storage device within the storage platform 204. For example, data storage device 326 may represent buffers in execution platform 208, storage devices in cloud storage platform 204, or any other storage device.

As described in embodiments herein, the compute service manager 206 validates all communication from an execution platform (e.g., the execution platform 208) to validate that the content and context of that communication are consistent with the task(s) known to be assigned to the execution platform. For example, an instance of the execution platform executing a query A should not be allowed to request access to data-source D (e.g., data storage device 326) that is not relevant to query A. Similarly, a given execution node (e.g., execution node 402-1) may need to communicate with another execution node (e.g., execution node 402-2), and should be disallowed from communicating with a third execution node (e.g., execution node 412-1) and any such illicit communication can be recorded (e.g., in a log or other location). Also, the information stored on a given execution node is restricted to data relevant to the current query and any other data is unusable, rendered so by destruction or encryption where the key is unavailable.

As shown, the network-based database system 202 includes the communication content generation system 104. According to some embodiments, the network-based database system 202 implements at least a portion of the communication content generation system 104. Additionally, for some embodiments, the network-based database system 202 implements at least a portion of the organization intelligence database 106.

Figure 4:
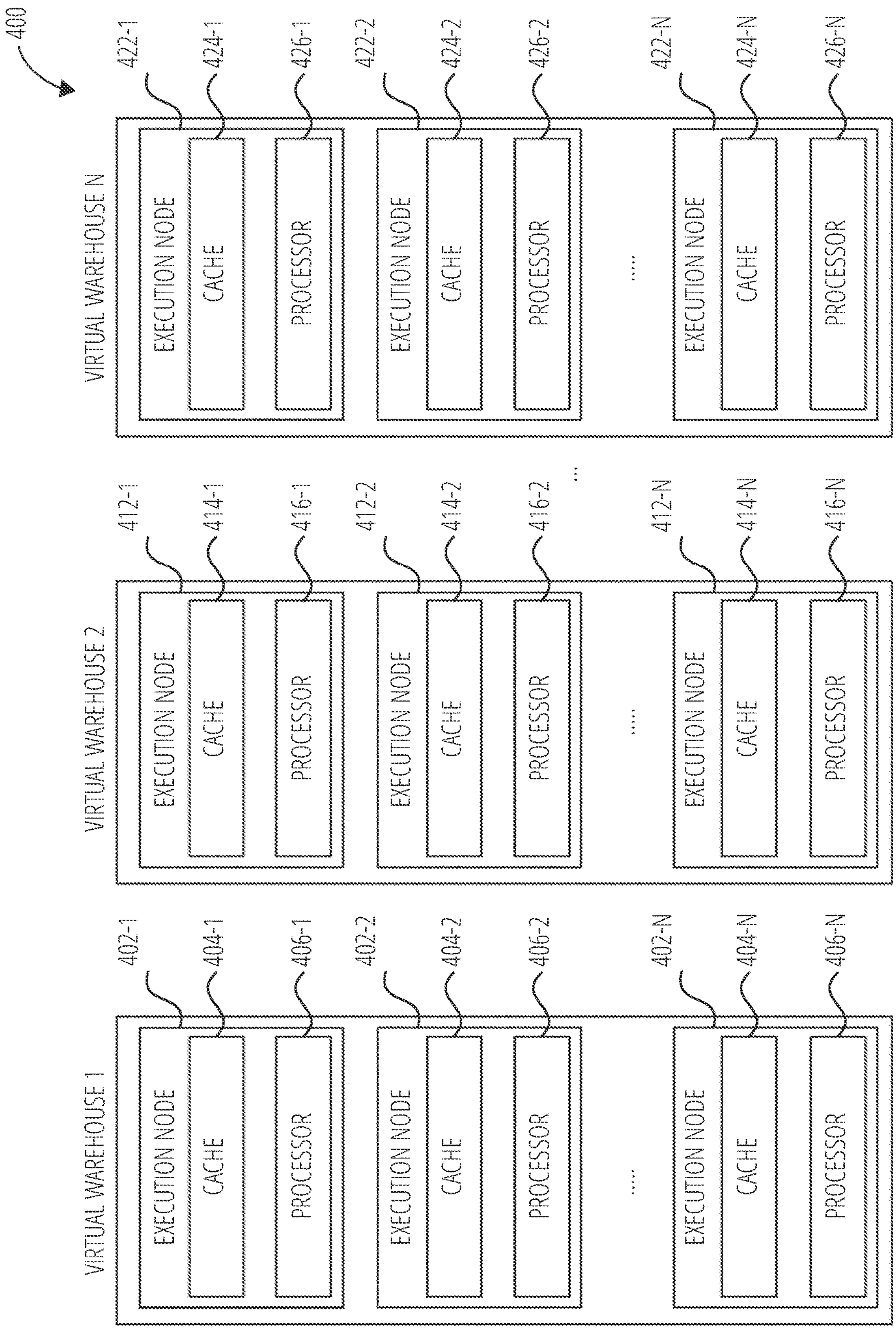
FIG. 4 is a block diagram illustrating components of an execution platform, according to some embodiments of the present disclosure.

FIG. 4 is a block diagram 400 illustrating components of the execution platform 208, according to some embodiments of the present disclosure. As shown in FIG. 4, the execution platform 208 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 208 can add new virtual warehouses and drop existing virtual warehouses in real-time based on the current processing needs of the systems and users. This flexibility allows the execution platform 208 to quickly deploy large amounts of computing resources when needed without being forced to continue paying for those computing resources when they are no longer needed. All virtual warehouses can access data from any data storage device (e.g., any storage device in storage platform 204).

Although each virtual warehouse shown in FIG. 4 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 240-1 to 240-N shown in FIG. 3. Thus, the virtual warehouses are not necessarily assigned to a specific data storage device 240-1 to 240-N and, instead, can access data from any of the data storage devices 240-1 to 240-N within the storage platform 204. Similarly, each of the execution nodes shown in FIG. 4 can access data from any of the data storage devices 240-1 to 240-N. In some embodiments, a particular virtual warehouse or a particular execution node can be temporarily assigned to a specific data storage device, but the virtual warehouse or execution node may later access data from any other data storage device.

In the example of FIG. 4, virtual warehouse 1 includes three execution nodes 402-1, 402-2, and 402-N. Execution node 402-1 includes a cache 404-1 and a processor 406-1. Execution node 402-2 includes a cache 404-2 and a processor 406-2. Execution node 402-N includes a cache 404-N and a processor 406-N. Each execution node 402-1, 402-2, and 402-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 412-1, 412-2, and 412-N. Execution node 412-1 includes a cache 414-1 and a processor 416-1. Execution node 412-2 includes a cache 414-2 and a processor 416-2. Execution node 412-N includes a cache 414-N and a processor 416-N. Additionally, virtual warehouse N includes three execution nodes 422-1, 422-2, and 422-N. Execution node 422-1 includes a cache 424-1 and a processor 426-1. Execution node 422-2 includes a cache 424-2 and a processor 426-2. Execution node 422-N includes a cache 424-N and a processor 426-N.

In some embodiments, the execution nodes shown in FIG. 4 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 4 each includes one data cache and one processor, alternate embodiments may include execution nodes containing any number of processors and any number of caches. Additionally, the caches may vary in size among the different execution nodes. The caches shown in FIG. 4 store, in the local execution node, data that was retrieved from one or more data storage devices in storage platform 204. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 204.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 208, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 4 as having multiple execution nodes. The multiple execution nodes associated with each virtual warehouse can be implemented using multiple computing systems at multiple geographic locations. For example, an instance of virtual warehouse 1 implements execution nodes 402-1 and 402-2 on one computing platform at a geographic location and implements execution node 402-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 208 is also fault tolerant. For example, if one virtual warehouse fails, that virtual warehouse is quickly replaced with a different virtual warehouse at a different geographic location. A particular execution platform 208 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some embodiments, the virtual warehouses may operate on the same data in storage platform 204, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 5:
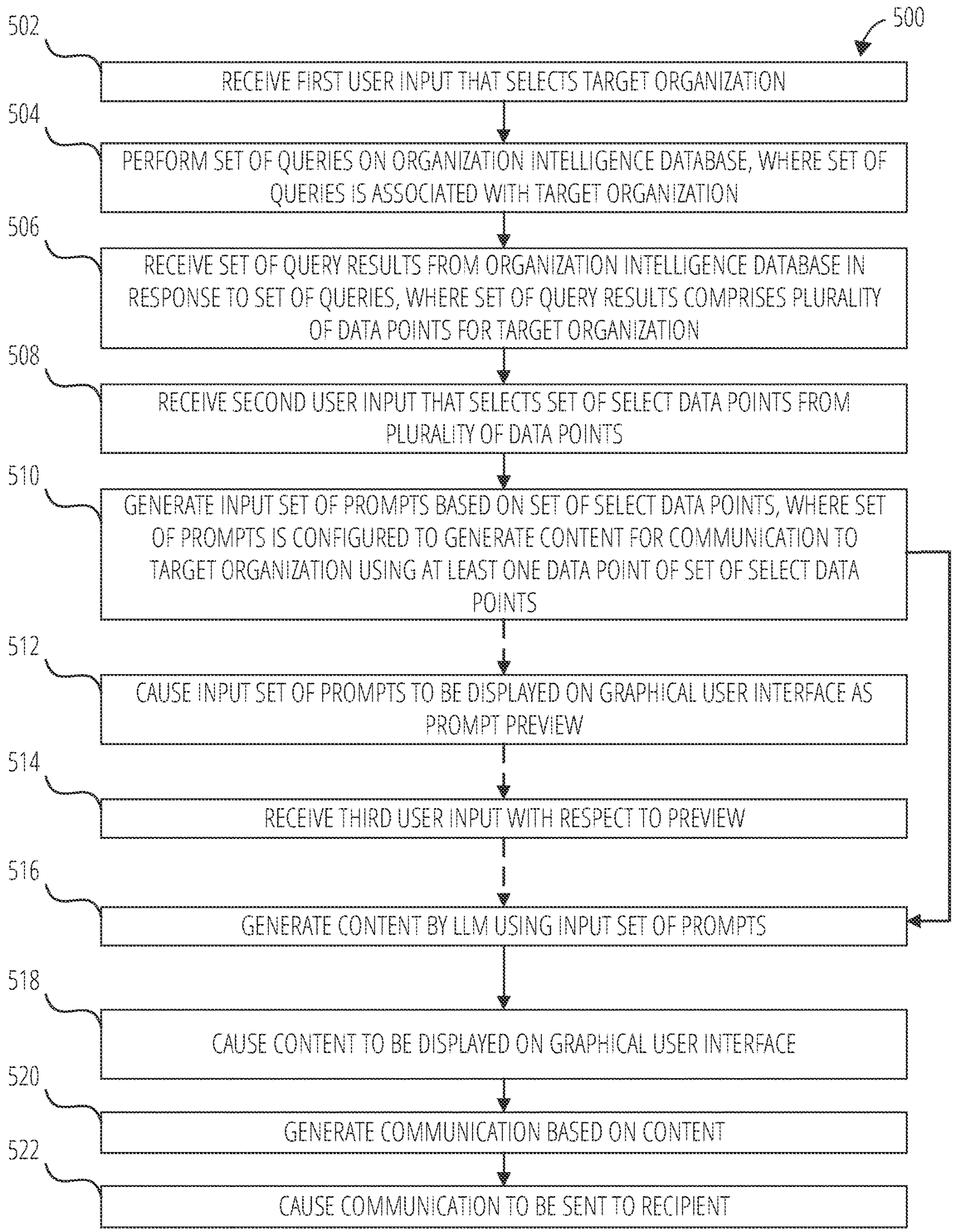
FIG. 5 is a flowchart of an example method for generating communication content using one or more LLMs, according to some embodiments of the present disclosure.

FIG. 5 is a flowchart of an example method 500 for generating communication content using one or more LLMs, according to some embodiments of the present disclosure. Method 500 may be embodied in computer-readable instructions for execution by one or more hardware components (e.g., one or more processors) such that the operations of method 500 can be performed by components of the communication content generation system 104 or the network-based database system 202, such as a network node (e.g., the communication content generation system 104 executing on a network node of the compute service manager 206) or a computing device (e.g., client device 212), one or both of which may be implemented as machine 1000 of FIG. 10 performing the disclosed functions. Accordingly, method 500 is described below, by way of example with reference thereto. However, it shall be appreciated that method 500 may be deployed on various other hardware configurations and is not intended to be limited to deployment within the network-based database system 202.

At operation 502, a hardware processor (e.g., implementing the communication content generation system 104) receives a first user input that comprises a selection of a target organization. For some embodiments, the first user input is received via a graphical user interface (e.g., 120), where the hardware processor (e.g., of the communication content generation system 104) causes the graphical user interface to be displayed on a client device (e.g., on the browser 110).

During operation 504, the hardware processor (e.g., implementing the communication content generation system 104) performs a set of queries on an organization intelligence database (e.g., 106), where the set of queries is associated with the target organization. For various embodiments, one or more queries of the set of queries are generated based on a set of predefined queries configured to retrieve relevant information for a given organization. Additionally, to generate the set of queries, a name or an identifier associated with the target organization can be inserted into one or more queries in the set of queries. In response to the set of queries, the hardware processor receives a set of query results from the organization intelligence database (e.g., 106) at operation 506, where the set of query results comprises a plurality of data points for the target organization.

At operation 508, the hardware processor (e.g., implementing the communication content generation system 104) receives a second user input that comprises a selection of a set of select data points from the plurality of data points. For some embodiments, the second user input is received via a graphical user interface (e.g., 120). Additionally, prior to method 500 proceeding to a next operation, the hardware processor can receive one or more additional user inputs for modifying (e.g., overriding the value of) one or more data points in the set of select data points.

During operation 510, the hardware processor (e.g., implementing the communication content generation system 104) generates an input set of prompts based on the set of select data points, where the set of prompts is configured to generate content for a communication to the target organization using at least one data point of the set of select data points. For some embodiments, operation 510 comprises the hardware processor uses a given LLM (e.g., a first LLM of the LLMs 124) to generate a summary of the target organization based on at least one data point of the set of select data points, and the hardware processor generates at least one prompt in the input set of prompts based on the summary of the target organization.

For some embodiments, during operation 510, the hardware processor: uses a given LLM (e.g., a second LLM of the LLMs 124) to generate a summary of the target organization based on at least one data point of the set of select data points; based on at least one statement (e.g., data point) from the summary of the target organization, the hardware processor selects a set of use cases relevant to the target organization; and generates at least one prompt in the input set of prompts based on at least one use case of the set of use cases. To select the set of use cases based on at least one statement from the summary of the target organization, the hardware processor can generate a question based on the at least one statement from the summary of the target organization, vectorize the question to generate a vectorized search input, search a vectorized database of use cases using the vectorized search input, and receive a search result from the vectorized database, where the search result comprises the set of use cases. Additionally, the hardware processor can cause the set of use cases to be displayed (e.g., as a list of use cases) via a graphical user interface (e.g., 120), a user (e.g., 108) can select the at least one use case, and then the at least one prompt in the input set of prompts can be generated based on the at least one use case of the set of use cases.

For various embodiments, during operation 510, the hardware processor: uses a given LLM (e.g., a second LLM of the LLMs 124) to generate a summary of the target organization based on at least one data point of the set of select data points; based on at least one statement (e.g., data point) from the summary of the target organization, generates a set of use cases relevant to the target organization by another LLM (e.g., a third LLM of the LLMs 124); and generates at least one prompt in the input set of prompts based on at least one use case of the set of use cases. Additionally, the hardware processor can cause the set of use cases to be displayed (e.g., as a list of use cases) via a graphical user interface (e.g., 120), a user (e.g., 108) can select the at least one use case, and then the at least one prompt in the input set of prompts can be generated based on the at least one use case of the set of use cases. According to some embodiments, the user (e.g., 108) can apply one or more modifications (e.g., inline modifications) to at least one selected use case prior to the hardware processor generating the at least one prompt in the input set of prompts based on the at least one selected use case.

According to some embodiments, during operation 510, the hardware processor: uses a given LLM (e.g., a fourth LLM of the LLMs 124) to generate a summary of the target organization based on at least one data point of the set of select data points; based on at least one statement (e.g., data point) from the summary of the target organization, selects a set of communication templates relevant to the target organization; and causes the set of communication templates to be displayed (e.g., as a list of communication templates) via a graphical user interface (e.g., 120). Thereafter, the hardware processor can receive a third user input (e.g., via graphical user interface 120) that comprises a selection of at least one communication template of the set of communication templates, and the hardware processor can generate at least one prompt in the input set of prompts based on at least one communication template of the set of communication templates. According to some embodiments, the user (e.g., 108) can apply one or more modifications (e.g., inline modifications) to at least one selected communication template prior to the hardware processor generating the at least one prompt in the input set of prompts based on the at least one selected communication template.

After operation 510, method 500 can proceed to operation 512 or operation 516.

At operation 512, the hardware processor (e.g., implementing the communication content generation system 104) causes the input set of prompts to be displayed on the graphical user interface (e.g., 120) as a prompt preview. In doing so, some embodiments permit a user (e.g., 108) to review and possibly modify one or more prompts in the input set of prompts prior to the hardware processor submitting the input set of prompts to an LLM for processing. Accordingly, during operation 514, the hardware processor receives a third user input with respect to the prompt preview, where the third user input comprises a set of modifications to the input set of prompts, or the third user input comprises approval of the input set of prompts, or both. If the input set of prompts are approved (with or without modification), method 500 can proceed to operation 516. If, however, the input set of prompts is rejected, the hardware processor can return to a prior step of the communication content generation process (e.g., operation 508 or operation 510), thereby enabling the user (e.g., 108) to retry the process with different or modified data points, a different or modified use case, or a different or modified communication template.

For operation 516, the hardware processor (e.g., implementing the communication content generation system 104) generates the content by a given LLM (e.g., a fifth LLM of the LLMs 124) using the input set of prompts. For some embodiments, the hardware processor generates the content by the LLM using the input set of prompts as approved (with or without modification) during operation 514. Thereafter, at operation 518, the hardware processor causes the content generated by operation 516 to be displayed on a graphical user interface (e.g., 120) as a content preview. Through the graphical user interface, a user (e.g., 108) can receive a fourth user input with respect to the content preview, where the fourth user input can apply one or more modifications (e.g., inline modifications) to the content as displayed prior to moving to a next step in the process. Alternatively, the user (e.g., 108) can reject the content as displayed, which can cause the hardware processor can return to a prior step of the communication content generation process (e.g., operation 508 or operation 510), thereby enabling the user (e.g., 108) to retry the process with different or modified data points, a different or modified use case, or a different or modified communication template.

During operation 520, the hardware processor (e.g., implementing the communication content generation system 104) generates the communication based on the content generated by operation 516. Depending on the embodiment, the communication can be an e-mail, a message over a social media platform, or a transcript (e.g., to be used for a phone conversation). Where applicable, method 500 proceeds to operation 522, where the hardware processor causes the communication generated by operation 520 to be sent to a recipient. Depending on the embodiment, the recipient can be a recipient at the target organization.

FIGS. 6 through 9 illustrate example graphical user interfaces that can be used with various embodiments of the present disclosure. In particular, the graphical user interfaces can represent ones that a communication content generation system (e.g., 104) described herein can display/present to a user on a client device.

Figure 6:
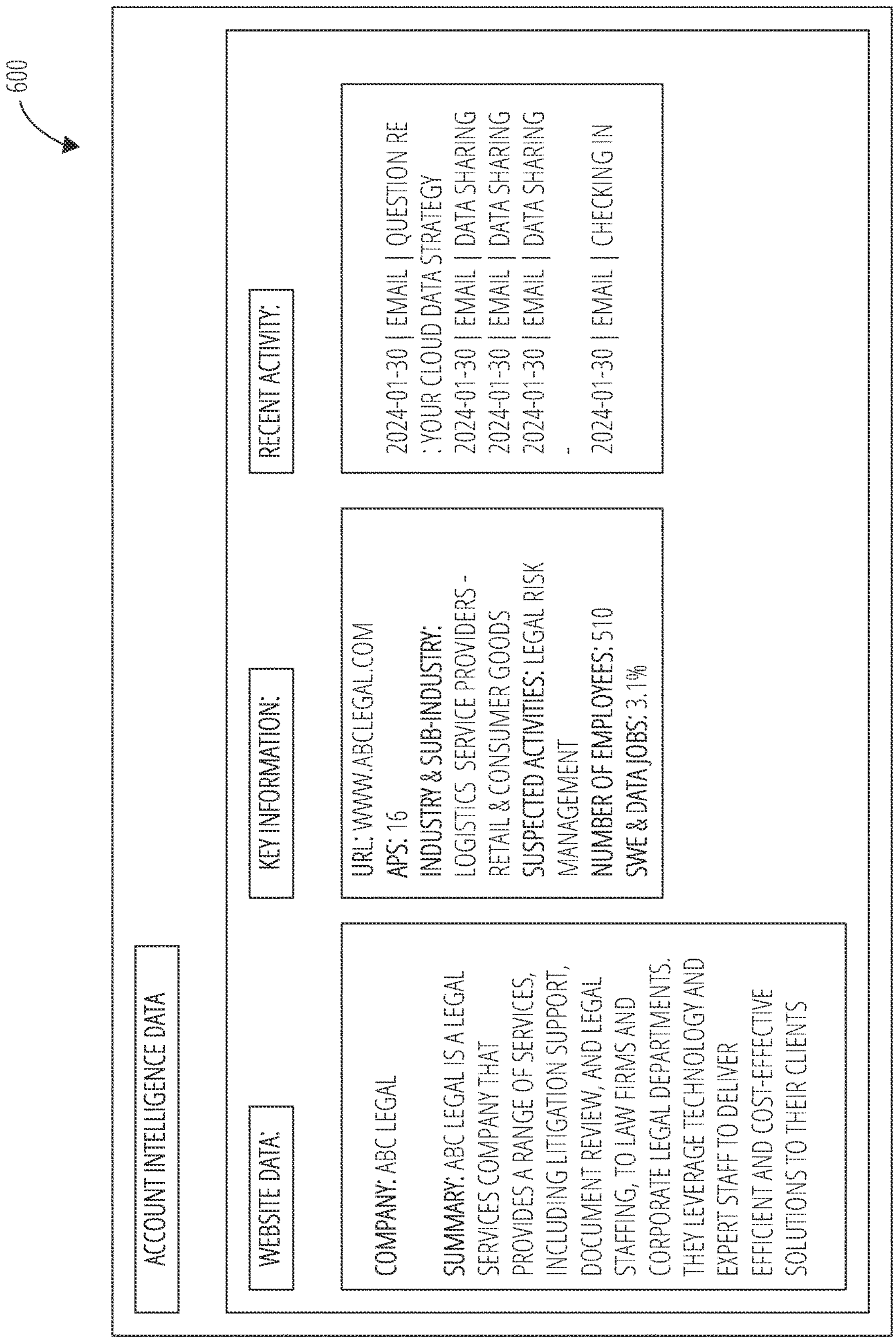

Referring to FIG. 6, graphical user interface 600 is an example of a graphical user interface displaying multiple data points associated with a target organization. According to some embodiments, a user (e.g., 108) can review the displayed data points, can select one or more data points for use in generating communication content, and can modify one or more of the data points (e.g., selected data points) prior to moving forward in generating communication content.

Referring to FIG. 7, graphical user interface 700 is an example of a graphical user interface displaying multiple use cases associated with a target organization. According to some embodiments, a user (e.g., 108) can review the displayed use cases, can select one or more of the displayed use cases for use in generating communication content, and can modify one or more of the displayed use cases (e.g., selected use cases) prior to moving forward in generating communication content.

Referring to FIG. 8, graphical user interface 800 is an example of a graphical user interface displaying a communication template associated with a target organization. According to some embodiments, a user (e.g., 108) can review the displayed communication template, and can modify the displayed communication template prior to moving forward in generating communication content.

Referring to FIG. 9, graphical user interface 900 is an example of a graphical user interface displaying an input set of prompts generated according to various embodiments. According to some embodiments, a user (e.g., 108) can review the input set of prompts, and can modify the input set of prompts prior to moving forward in generating communication content (e.g., sending a communication comprising the content). Table 1 below illustrates the input set of prompts in detail.

TABLE 1

<rules> 1. Your name is John Smith and you are a sales agent at Source Organization and have a tile of Account Executive.
2 Your goal is to write a PROFESSIONAL email to the PERSON: Amy Brodsky from COMPANY: ABC Legal Services.
2. Be concise in your writing, the email should NOT BE LONGER than 150 WORDS.
3. Select top 3 USE CASES to provide showcase benefits to the customer. 4. Structure the email with the FORMAT provided.
5. Your goal is to give correct answer to users, double check that use cases are relevant to the example email.
6. Politely request a 30 min meeting with the customer at the end of the email. 7. Format the output by breaking lines after bullet points section and after paragraphs ends. 8. Double check that the email is addressed to company ABC Legal Services AND length of the email doesn't exceed 150 words! </rules>. USE CASES:

TABLE 1-continued

The legal services industry can benefit from Source Organization's cloud-based data platform in various ways. Here are some use cases and customers who have successfully implemented Our product in their operations:
1. e-Discovery: Law firms and legal organizations can use Our product to process, analyze, and review large volumes of data for electronic discovery. Our product's ability to handle raw data in JSON format and run complex analytics and data science tasks make it an ideal solution for this use case.
2. Compliance and Risk Management: Financial institutions and legal organizations can use Our product to monitor and analyze data in real-time to detect and identify patterns that may indicate fraud or non-compliance. Our product's ability to handle large amounts of data and provide real-time reporting makes it an ideal solution for this use case.
3. Legal Research: Legal research firms and law libraries can use Our product to store, process, and analyze large volumes of legal data, such as case law, statues, and regulations. Our product's ability to handle structured and unstructured data and run complex queries makes it an ideal solution for this use case.
4. Contract Management: Legal departments and law firms can use Our product to manage and analyze contract data, including contract terms, obligations, and performance. Our product's ability to handle structured data and run complex analytics and data science tasks makes it an ideal solution for this use case.
Customers who have successfully implemented Our product in the legal services industry include:
1. Credit Service ABC: a leading provider of credit reporting and risk assessment services, uses Our product to ingest and analyze large volumes of data to improve their lending ability.
2. Financial Data Provider DEF: a leading provider of financial data and analytics, uses Our product to handle a large influx of customers and data, and to provide real-time reporting and analytics.
These are just a few examples of how 's cloud-based data platform can be used in the legal services industry. Its ability to handle large volumes of data, provide real-time reporting, and run complex analytics and data science tasks makes it an ideal solution for a wide range of legal use cases. Draft and email.

Figure 10:
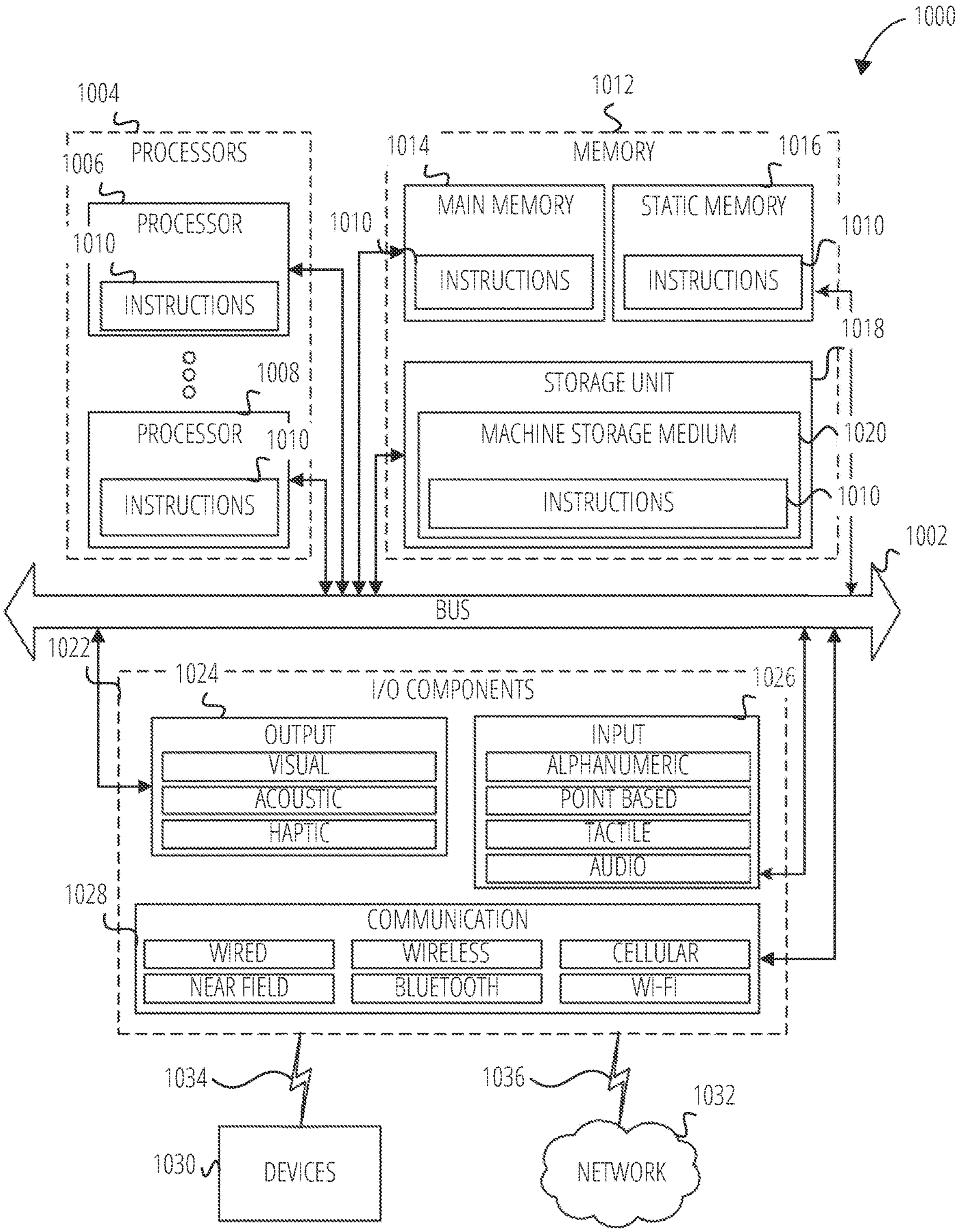
FIG. 10 illustrates a diagrammatic representation of a machine in the form of a computer system within which a set of instructions may be executed for causing the machine to perform any one or more of the methodologies discussed herein, according to some embodiments of the present disclosure.

FIG. 10 illustrates a diagrammatic representation of a machine 1000 in the form of a computer system within which a set of instructions can be executed for causing the machine 1000 to perform any one or more of the methodologies discussed herein, according to some embodiments of the present disclosure. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein can be executed. For example, the instructions 1010 may cause the machine 1000 to execute any one or more operations of any one or more of the methods described herein. As another example, the instructions 1010 may cause the machine 1000 to implement portions of the data flows described herein. In this way, the instructions 1010 transform a general, non-programmed machine into a particular machine 1000 (e.g., the compute service manager 206, the execution platform 208, client device 212) that is specially configured to carry out any one of the described and illustrated functions in the manner described herein.

In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines machine 1000 that individually or jointly execute the instructions 1010 to perform any one or more of the methodologies discussed herein.

The machine 1000 includes processors 1004, memory 1012, and input/output (I/O) components 1022 configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1006 and a processor 1008 that may execute the instructions 1010. The term "processor" is intended to include multi-core processors 1004 that may comprise two or more independent processors (sometimes referred to as "cores") that may execute instructions 1010 contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory 1012 may include a main memory 1014, a static memory 1016, and a storage unit 1018, all accessible to the processors 1004 such as via the bus 1002. The main memory 1014, the static memory 1016, and the storage unit 1018 comprising a machine storage medium 1020 may store the instructions 1010 embodying any one or more of the methodologies or functions described herein. The instructions 1010 may also reside, completely or partially, within the main memory 1014, within the static memory 1016, within the storage unit 1018, within at least one of the processors 1004 (e.g., within the processor's cache memory), or any suitable combination thereof, during execution thereof by the machine 1000.

The I/O components 1022 include components to receive input, provide output, produce output, transmit information, exchange information, capture measurements, and so on. The specific I/O components 1022 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1022 may include many other components that are not shown in FIG. 10. The I/O components 1022 are grouped according to functionality merely for simplifying the following discussion and the grouping is in no way limiting. In various example embodiments, the I/O components 1022 may include output components 1024 and input components 1026. The output components 1024 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 1022 may include communication components 1028 operable to couple the machine 1000 to a network 1032 via a coupling 1036 or to devices 1030 via a coupling 1034. For example, the communication components 1028 may include a network interface component or another suitable device to interface with the network 1032. In further examples, the communication components 1028 may include wired communication components, wireless communication components, cellular communication components, and other communication components to provide communication via other modalities. The devices 1030 can be another machine or any of a wide variety of peripheral devices (e.g., a peripheral device coupled via a universal serial bus (USB)). For example, as noted above, the machine 1000 may correspond to any client device, the compute service manager 206, the execution platform 208, and the devices 1030 may include any other of these systems and devices.

The various memories (e.g., 1012, 1014, 1016, and/or memory of the processor(s) 1004 and/or the storage unit 1018) may store one or more sets of instructions 1010 and data structures (e.g., software) embodying or utilized by any one or more of the methodologies or functions described herein. These instructions 1010, when executed by the processor(s) 1004, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1032 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1032 or a portion of the network 1032 may include a wireless or cellular network, and the coupling 1036 can be a Code Division Multiple Access (CDMA) connection, a Global System for Mobile communications (GSM) connection, or another type of cellular or wireless coupling. In this example, the coupling 1036 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1010 can be transmitted or received over the network 1032 using a transmission medium via a network interface device (e.g., a network interface component included in the communication components 1028) and utilizing any one of a number of well-known transfer protocols (e.g., hypertext transfer protocol (HTTP)). Similarly, the instructions 1010 can be transmitted or received using a transmission medium via the coupling 1034 (e.g., a peer-to-peer coupling) to the devices 1030. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 1010 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: receiving a first user input that comprises a selection of a target organization; performing a set of queries on an organization intelligence database, the set of queries being associated with the target organization; receiving a set of query results from the organization intelligence database in response to the set of queries, the set of query results comprising a plurality of data points for the target organization; receiving a second user input that comprises a selection of a set of select data points from the plurality of data points; generating an input set of prompts based on the set of select data points, the set of prompts being configured to generate content for a communication to the target organization using at least one data point of the set of select data points; generating, by a large-language model (LLM), the content using the input set of prompts; and causing the content to be displayed on a graphical user interface.

In Example 2, the subject matter of Example 1 includes, wherein the LLM is a first LLM, and wherein the generating of the input set of prompts based on the set of select data points comprises: generating, by a second LLM, a summary of the target organization based on at least one data point of the set of select data points; and generating at least one prompt in the input set of prompts based on the summary of the target organization.

In Example 3, the subject matter of Examples 1-2 includes, wherein the LLM is a first LLM, and wherein the generating of the input set of prompts based on the set of select data points comprises: generating, by a second LLM, a summary of the target organization based on the at least one data point of the set of select data points; and based on at least one statement from the summary of the target organization, selecting a set of use cases relevant to the target organization; and generating at least one prompt in the input set of prompts based on at least one use case of the set of use cases.

In Example 4, the subject matter of Example 3 includes, wherein the selecting of the set of use cases based on the at least one statement from the summary of the target organization comprises: generating a question based on the at least one statement from the summary of the target organization; and vectorizing the question to generate a vectorized search input; searching a vectorized database of use cases using the vectorized search input; and receiving a search result from the vectorized database, the search result comprising the set of use cases.

In Example 5, the subject matter of Examples 1-4 includes, wherein the LLM is a first LLM, and wherein the generating of the input set of prompts based on the set of select data points comprises: generating, by a second LLM, a summary of the target organization based on at least a portion of the set of select data points; and based on at least one statement from the summary of the target organization, generating a set of use cases relevant to the target organization by a third LLM; and generating at least one prompt in the input set of prompts based on at least one use case of the set of use cases.

In Example 6, the subject matter of Examples 1-5 includes, wherein the LLM is a first LLM, and wherein the generating of the input set of prompts based on the set of select data points comprises: generating, by a second LLM, a summary of the target organization based on at least one data point of the set of select data points; and based on at least one statement from the summary of the target organization, selecting a set of communication templates relevant to the target organization; and generating at least one prompt in the input set of prompts based on at least one communication template of the set of communication templates.

In Example 7, the subject matter of Examples 1-6 includes, wherein the LLM is a first LLM, and wherein the generating of the input set of prompts based on the set of select data points comprises: generating, by a second LLM, a summary of the target organization based on at least one data point of the set of select data points; and based on at least one statement from the summary of the target organization, selecting a set of communication templates relevant to the target organization; receiving a third user input that comprises a selection of at least one communication template of the set of communication templates; and generating at least one prompt in the input set of prompts based on the at least one communication template.

In Example 8, the subject matter of Examples 1-7 includes, wherein the operations comprise: prior to generating the content by the LLM using the input set of prompts: causing the input set of prompts to be displayed on the graphical user interface as a prompt preview; and receiving a third user input with respect to the prompt preview, the generating of the content by the LLM using the input set of prompts being performed in response to the third user input indicating approval of the input set of prompts.

In Example 9, the subject matter of Examples 1-8 includes, wherein the operations comprise: prior to generating the content by the LLM using the input set of prompts: causing the input set of prompts to be displayed on the graphical user interface as a prompt preview; and receiving a third user input with respect to the prompt preview, the third user input comprising a set of modifications to the input set of prompts, the generating of the content by the LLM using the input set of prompts comprising: generating the content by the LLM using the input set of prompts as modified by the set of modifications.

In Example 10, the subject matter of Examples 1-9 includes, wherein the communication comprises an e-mail.

In Example 11, the subject matter of Examples 1-10 includes, wherein the communication comprises a transcript.

Example 12 is a method comprising: receiving, by a hardware processor, a first user input that comprises a selection of a target organization; performing, by the hardware processor, a set of queries on an organization intelligence database, the set of queries being associated with the target organization; receiving, by the hardware processor, a set of query results from the organization intelligence database in response to the set of queries, the set of query results comprising a plurality of data points for the target organization; receiving, by the hardware processor, a second user input that comprises a selection of a set of select data points from the plurality of data points; generating, by the hardware processor, an input set of prompts based on the set of select data points, the set of prompts being configured to generate content for a communication to the target organization using at least one data point of the set of select data points; generating, by the hardware processor and a large-language model (LLM), the content using the input set of prompts; and causing, by the hardware processor, the content to be displayed on a graphical user interface.

In Example 13, the subject matter of Example 12 includes, wherein the LLM is a first LLM, and wherein the generating of the input set of prompts based on the set of select data points comprises: generating, by a second LLM, a summary of the target organization based on at least one data point of the set of select data points; and generating at least one prompt in the input set of prompts based on the summary of the target organization.

In Example 14, the subject matter of Examples 12-13 includes, wherein the LLM is a first LLM, and wherein the generating of the input set of prompts based on the set of select data points comprises: generating, by a second LLM, a summary of the target organization based on the at least one data point of the set of select data points; and based on at least one statement from the summary of the target organization, selecting a set of use cases relevant to the target organization; and generating at least one prompt in the input set of prompts based on at least one use case of the set of use cases.

In Example 15, the subject matter of Examples 12-14 includes, wherein the LLM is a first LLM, and wherein the generating of the input set of prompts based on the set of select data points comprises: generating, by a second LLM, a summary of the target organization based on at least one data point of the set of select data points; and based on at least one statement from the summary of the target organization, generating a set of use cases relevant to the target organization by a third LLM; and generating at least one prompt in the input set of prompts based on at least one use case of the set of use cases.

In Example 16, the subject matter of Examples 12-15 includes, wherein the LLM is a first LLM, and wherein the generating of the input set of prompts based on the set of select data points comprises: generating, by a second LLM, a summary of the target organization based on at least one data point of the set of select data points; and based on at least one statement from the summary of the target organization, selecting a set of communication templates relevant to the target organization; and generating at least one prompt in the input set of prompts based on at least one communication template of the set of communication templates.

In Example 17, the subject matter of Examples 12-16 includes, wherein the LLM is a first LLM, and wherein the generating of the input set of prompts based on the set of select data points comprises: generating, by a second LLM, a summary of the target organization based on at least one data point of the set of select data points; and based on at least one statement from the summary of the target organization, selecting a set of communication templates relevant to the target organization; receiving a third user input that comprises a selection of at least one communication template of the set of communication templates; and generating at least one prompt in the input set of prompts based on the at least one communication template.

In Example 18, the subject matter of Examples 12-17 includes, prior to generating the content by the LLM using the input set of prompts: causing the input set of prompts to be displayed on the graphical user interface as a prompt preview; and receiving a third user input with respect to the prompt preview, the generating of the content by the LLM using the input set of prompts being performed in response to the third user input indicating approval of the input set of prompts.

In Example 19, the subject matter of Examples 12-18 includes, prior to generating the content by the LLM using the input set of prompts: causing the input set of prompts to be displayed on the graphical user interface as a prompt preview; and receiving a third user input with respect to the prompt preview, the third user input comprising a set of modifications to the input set of prompts, the generating of the content by the LLM using the input set of prompts comprising: generating the content by the LLM using the input set of prompts as modified by the set of modifications.

Example 20 is machine-storage storage medium, the machine-storage medium including instructions that when executed by a machine, cause the machine to perform operations to implement of any of Examples 1-19.

Example 21 is a method to implement of any of Examples 1-19.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:

at least one hardware processor; and at least one memory storing instructions that cause the at least one hardware processor to perform operations comprising:

receiving a first user input that comprises a selection of a target organization;

performing a set of queries on an organization intelligence database, the set of queries being associated with the target organization;

receiving a set of query results from the organization intelligence database in response to the set of queries, the set of query results comprising a plurality of data points for the target organization for the target organization;

receiving a second user input that comprises a selection of a set of select data points from the plurality of data points;

generating an input set of prompts based on the set of select data points, the set of prompts being configured to generate content for a communication to the target organization using at least one data point of the set of select data points;

generating, by a large-language model (LLM), the content using the input set of prompts; and causing the content to be displayed on a graphical user interface.

2. The system of claim 1, wherein the LLM is a first LLM, and wherein the generating of the input set of prompts based on the set of select data points comprises:

generating, by a second LLM, a summary of the target organization based on the at least one data point of the set of select data points; and generating at least one prompt in the input set of prompts based on the summary of the target organization.

3. The system of claim 1, wherein the LLM is a first LLM, and wherein the generating of the input set of prompts based on the set of select data points comprises:

generating, by a second LLM, a summary of the target organization based on the at least one data point of the set of select data points;

based on at least one statement from the summary of the target organization, selecting a set of use cases relevant to the target organization; and generating at least one prompt in the input set of prompts based on at least one use case of the set of use cases.

4. The system of claim 3, wherein the selecting of the set of use cases based on the at least one statement from the summary of the target organization comprises:

generating a question based on the at least one statement from the summary of the target organization;

vectorizing the question to generate a vectorized search input;

searching a vectorized database of use cases using the vectorized search input; and receiving a search result from the vectorized database, the search result comprising the set of use cases.

5. The system of claim 1, wherein the LLM is a first LLM, and wherein the generating of the input set of prompts based on the set of select data points comprises:

generating, by a second LLM, a summary of the target organization based on at least a portion of the set of select data points;

based on at least one statement from the summary of the target organization, generating a set of use cases relevant to the target organization by a third LLM; and generating at least one prompt in the input set of prompts based on at least one use case of the set of use cases.

6. The system of claim 1, wherein the LLM is a first LLM, and wherein the generating of the input set of prompts based on the set of select data points comprises:

generating, by a second LLM, a summary of the target organization based on at least one data point of the set of select data points;

based on at least one statement from the summary of the target organization, selecting a set of communication templates relevant to the target organization; and generating at least one prompt in the input set of prompts based on at least one communication template of the set of communication templates.

7. The system of claim 1, wherein the LLM is a first LLM, and wherein the generating of the input set of prompts based on the set of select data points comprises:

generating, by a second LLM, a summary of the target organization based on at least one data point of the set of select data points;

based on at least one statement from the summary of the target organization, selecting a set of communication templates relevant to the target organization;

receiving a third user input that comprises a selection of at least one communication template of the set of communication templates; and generating at least one prompt in the input set of prompts based on the at least one communication template.

8. The system of claim 1, wherein the operations comprise:

prior to generating the content by the LLM using the input set of prompts:

causing the input set of prompts to be displayed on the graphical user interface as a prompt preview; and receiving a third user input with respect to the prompt preview, the generating of the content by the LLM using the input set of prompts being performed in response to the third user input indicating approval of the input set of prompts.

9. The system of claim 1, wherein the operations comprise:

prior to generating the content by the LLM using the input set of prompts:

causing the input set of prompts to be displayed on the graphical user interface as a prompt preview; and receiving a third user input with respect to the prompt preview, the third user input comprising a set of modifications to the input set of prompts, the generating of the content by the LLM using the input set of prompts comprising:

generating the content by the LLM using the input set of prompts as modified by the set of modifications.

10. The system of claim 1, wherein the communication comprises an e-mail.

11. The system of claim 1, wherein the communication comprises a transcript.

12. A method comprising:

receiving, by a hardware processor, a first user input that comprises a selection of a target organization;

performing, by the hardware processor, a set of queries on an organization intelligence database, the set of queries being associated with the target organization;

receiving, by the hardware processor, a set of query results from the organization intelligence database in response to the set of queries, the set of query results comprising a plurality of data points for the target organization;

receiving, by the hardware processor, a second user input that comprises a selection of a set of select data points from the plurality of data points;

generating, by the hardware processor, an input set of prompts based on the set of select data points, the set of prompts being configured to generate content for a communication to the target organization using at least one data point of the set of select data points;

generating, by the hardware processor and a large-language model (LLM), the content using the input set of prompts; and causing, by the hardware processor, the content to be displayed on a graphical user interface.

13. The method of claim 12, wherein the LLM is a first LLM, and wherein the generating of the input set of prompts based on the set of select data points comprises:

generating, by a second LLM, a summary of the target organization based on at least one data point of the set of select data points; and generating at least one prompt in the input set of prompts based on the summary of the target organization.

14. The method of claim 12, wherein the LLM is a first LLM, and wherein the generating of the input set of prompts based on the set of select data points comprises:

generating, by a second LLM, a summary of the target organization based on the at least one data point of the set of select data points;

based on at least one statement from the summary of the target organization, selecting a set of use cases relevant to the target organization; and generating at least one prompt in the input set of prompts based on at least one use case of the set of use cases.

15. The method of claim 12, wherein the LLM is a first LLM, and wherein the generating of the input set of prompts based on the set of select data points comprises:

generating, by a second LLM, a summary of the target organization based on at least one data point of the set of select data points;

based on at least one statement from the summary of the target organization, generating a set of use cases relevant to the target organization by a third LLM; and generating at least one prompt in the input set of prompts based on at least one use case of the set of use cases.

16. The method of claim 12, wherein the LLM is a first LLM, and wherein the generating of the input set of prompts based on the set of select data points comprises:

generating, by a second LLM, a summary of the target organization based on at least one data point of the set of select data points;

based on at least one statement from the summary of the target organization, selecting a set of communication templates relevant to the target organization; and generating at least one prompt in the input set of prompts based on at least one communication template of the set of communication templates.

17. The method of claim 12, wherein the LLM is a first LLM, and wherein the generating of the input set of prompts based on the set of select data points comprises:

generating, by a second LLM, a summary of the target organization based on at least one data point of the set of select data points;

based on at least one statement from the summary of the target organization, selecting a set of communication templates relevant to the target organization;

receiving a third user input that comprises a selection of at least one communication template of the set of communication templates; and generating at least one prompt in the input set of prompts based on the at least one communication template.

18. The method of claim 12, comprising:

prior to generating the content by the LLM using the input set of prompts:

causing the input set of prompts to be displayed on the graphical user interface as a prompt preview; and receiving a third user input with respect to the prompt preview, the generating of the content by the LLM using the input set of prompts being performed in response to the third user input indicating approval of the input set of prompts.

19. The method of claim 12, comprising:

prior to generating the content by the LLM using the input set of prompts:

causing the input set of prompts to be displayed on the graphical user interface as a prompt preview; and receiving a third user input with respect to the prompt preview, the third user input comprising a set of modifications to the input set of prompts, the generating of the content by the LLM using the input set of prompts comprising:

generating the content by the LLM using the input set of prompts as modified by the set of modifications.

20. A non-transitory machine-storage medium, the machine-storage medium including instructions that when executed by a machine, cause the machine to perform operations comprising:

receiving a first user input that comprises a selection of a target organization;

performing a set of queries on an organization intelligence database, the set of queries being associated with the target organization;

receiving a set of query results from the organization intelligence database in response to the set of queries, the set of query results comprising a plurality of data points for the target organization;

receiving a second user input that comprises a selection of a set of select data points from the plurality of data points;

generating an input set of prompts based on the set of select data points, the set of prompts being configured to generate content for a communication to the target organization using at least one data point of the set of select data points;

generating, by a large-language model (LLM), the content using the input set of prompts; and causing the content to be displayed on a graphical user interface.

* * * * *